（12）United States Patent
Yagami et al.

(10) Patent No.: US 10,035,232 B2
(45) Date of Patent: Jul. 31, 2018

(54) BELLOWS WITH PROTECTIVE PLATE MEMBERS

(71) Applicant: NABELL CORPORATION, Iga-shi, Mie (JP)

(72) Inventors: Yuusuke Yagami, Iga (JP); Yoshinori Matsuoka, Iga (JP)

(73) Assignee: NABELL CORPORATION, Mie (JP)

( * ) Notice: Subject to any disclaimer, the term of this patent is extended or adjusted under 35 U.S.C. 154(b) by 116 days.

(21) Appl. No.: 14/892,135

(22) PCT Filed: Jan. 15, 2015

(86) PCT No.: PCT/JP2015/050922
§ 371 (c)(1),
(2) Date: Nov. 18, 2015

(87) PCT Pub. No.: WO2016/013231
PCT Pub. Date: Jan. 28, 2016

(65) Prior Publication Data
US 2016/0184949 A1 Jun. 30, 2016

(30) Foreign Application Priority Data

Jul. 22, 2014 (JP) .................................. 2014-148825

(51) Int. Cl.
*B23Q 11/08* (2006.01)
*F16P 1/00* (2006.01)
*F16P 3/02* (2006.01)

(52) U.S. Cl.
CPC ............ *B23Q 11/0816* (2013.01); *F16P 3/02* (2013.01)

(58) Field of Classification Search
CPC . B23Q 11/08; B23Q 11/0816; B23Q 11/0825; F16P 3/02
See application file for complete search history.

(56) References Cited

U.S. PATENT DOCUMENTS

| 4,596,162 A | 6/1986 | Walter et al. |
| 4,674,005 A | 6/1987 | Lacz |

(Continued)

FOREIGN PATENT DOCUMENTS

| CH | 665 898 A5 | 6/1988 |
| DE | 34 40 234 A1 | 5/1985 |

(Continued)

OTHER PUBLICATIONS

International Search Report for the Application No. PCT/JP2015/050922 dated Apr. 14, 2015.

*Primary Examiner* — Adam D Rogers
(74) *Attorney, Agent, or Firm* — Cheng Law Group, PLLC

(57) ABSTRACT

[Subject] To provide a novel bellows with protective plate members, which allows replacement of only damaged slat (s), rather than total replacement of the bellows, when damaged or deformed only in a part of a large number of fixed slats (protective plate members).

[Solving Means] The bellows includes a bellows body 2 having ridge parts 2a and valley parts 2b alternately formed therein, and having a bellows supporting plate 5 fixed inside thereof; a fixing plate 3 fixed to the bellows body 2; protective plate members 4 each having a fitting plate part 41 detachably attached to the fixing plate 3, and a protective plate 44; wherein the fixing plate 3 having formed therein one engagement parts 33, 34, the fitting plate part 41 having formed thereon other engagement part 45, 46, thereby making it possible to attach or detach the protective plate member 4 to and from the fixing plate 3.

9 Claims, 11 Drawing Sheets

(56) References Cited

U.S. PATENT DOCUMENTS

| | | | |
|---|---|---|---|
| 6,374,895 B1 * | 4/2002 | Li .......................... | E06B 9/262 |
| | | | 160/84.04 |
| 7,784,379 B2 * | 8/2010 | Schirling ........... | B23Q 11/0816 |
| | | | 160/202 |
| 2007/0230836 A1 | 10/2007 | Schirling | |
| 2016/0101495 A1 * | 4/2016 | Kreutzer ............ | B23Q 11/0825 |
| | | | 160/131 |

FOREIGN PATENT DOCUMENTS

| | | | |
|---|---|---|---|
| DE | 9202522 U1 * | 4/1992 | ......... B23Q 11/0816 |
| DE | 10 2006 015 799 A1 | 10/2007 | |
| DE | 202016002430 U1 * | 7/2016 | ......... B23Q 11/0816 |
| EP | 0 195 701 A1 | 9/1986 | |
| EP | 1 842 620 A1 | 10/2007 | |
| FR | 2 578 710 A1 | 9/1986 | |
| JP | 61-501138 A | 6/1986 | |
| JP | 61-212100 A | 9/1986 | |
| JP | 2008-12639 A | 1/2008 | |
| JP | 4726611 B2 * | 7/2011 | ......... B23Q 11/0825 |
| JP | 4751256 B2 * | 8/2011 | ......... B23Q 11/0816 |
| JP | 2014-30886 A | 2/2014 | |
| WO | WO-85/02004 A1 | 5/1985 | |

* cited by examiner

BELLOWS WITH PROTECTIVE PLATE MEMBERS

TECHNICAL FIELD

This invention relates to a bellows with protective plate members, which is attached to equipment or apparatus, such as machine tools including machining center, lathe and milling machine, and semiconductor manufacturing equipment including dicing machine.

BACKGROUND ART

Welding or grinding of metal using a machining center, milling machine or the like, often scatters spatter, grinding chips or coolant, and a dicing machine scatters chips of diced semiconductor wafer. The scattered matters when adhered on a bellows of the equipment or apparatus may pierce the bellows. The bellows may also be broken or pierced, if it repeats stretching and contraction as the machine tool or the like operates over a long period, while carrying the grinding chips or debris caught between the ridge parts of the bellows, and the grinding chips or the like may adhere onto a ball screw or other driving system disposed inside the bellows, to thereby interfere with accurate positioning. In order to resolve such nonconformities regarding piercing of the bellows body due to the grinding chips or the like, the present applicant has proposed a bellows with protective plate members, having a stretchable bellows body, and provided thereto protective plate members (slat or slats, referred to as slats or protective plate members, hereinafter) made of metal or resin (see Patent Literatures 1, 2). Each of these bellows disclosed in Patent Literatures 1, 2 has a bellows body having ridge parts and valley parts alternately formed therein, and being configured stretchable in the direction normal to the longitudinal direction of the ridge parts and the valley parts; a bellows supporting plate or a shape retaining plate which is provided inside the bellows body, and fixed typically by bringing the upper edge thereof into contact with the back face of each ridge part; and slats whose base ends are fixed in the vicinity of the individual ridge parts which configure the bellows body, and being opposed to the bellows supporting plate or the shape retaining plate, while holding the bellows body in between.

According to the bellows with protective plate members disclosed in Patent Literatures 1, 2, the risk of piercing of the bellows body is avoidable, as a result of provision of a large number of slats which protect the bellows body even when the grinding chips or debris of semiconductor wafer were scattered.

PATENT LITERATURE

[Patent Literature 1] JP-A-2008-12639
[Patent Literature 2] JP-A-2014-30886

SUMMARY OF THE INVENTION

Technical Problem

Now the individual slats fixed to the bellows may partially deform or break, due to repeated stretching and contraction over a long period; or may deform during transportation, or as a result of accidental fall during transportation, or attachment of the bellows to equipment, or as a result of careless impact against a work or other equipment. There are not a few cases of breakage or damage, typically due to jamming or accumulation of particles or machining chips between the slats, as the bellows repetitively stretches and contracts in association with the operation of the machine tool. There may even be a case where the machining chips or coolant liquid used for the machining may collide on a part of slats, or on a limited area of a specific slat in a concentrated manner, to deform the slats by the pressure.

However, the individual slats fixed to the bellows, disclosed in Patent Literatures 1 and 2, are fixed at the end portions thereof as described above to the bellows supporting plate or the shape retaining plate, while holding the bellows body in between. Hence, the slats once fixed are no more detachable from the bellows body.

Accordingly, it has always been necessary to replace the whole bellows, even if only a part of a large number of fixed slats has been damaged or deformed due to any of the reasons described above, while leaving the other slats workable for subsequent use without problem.

It is therefore an object of this invention to resolve the problems of the conventional bellows described above, and to provide a bellows with protective plate members, which allows replacement of only damaged slat(s), rather than total replacement of the bellows, when damaged or deformed only in a part of a large number of fixed slats (protective plate members).

Solution to Problem

A first invention (the invention described in Claim 1) proposed aiming at solving the problems has: a bellows body having ridge parts and valley parts alternately formed therein, and being configured stretchable in the direction normal to the longitudinal direction of the ridge parts and the valley parts; a bellows supporting plate fixed inside the bellows body so as to vertically suspend from each ridge part; a fixing plate disposed outside the bellows body, having the width in the direction of stretching of the bellows body, and fixed to each bellows supporting plate while holding the bellows body in between; and protective plate members each including a fitting plate part detachably attached to each fixing plate, and a protective plate part which extends from the fitting plate part across a folded part so as to cover a top portion of the bellows body, characterized in that the fixing plate having, formed therein or arranged thereon in the longitudinal direction thereof, a plurality of one engagement parts or one engagement members; and the fitting plate part having, formed thereon or around, a plurality of the other engagement parts which respectively engage with the one engagement parts or the one engagement members, and each protective plate member being configured attachable and detachable to and from the fixing plate, as a result of engagement of the one engagement parts or the one engagement members with the other engagement parts, and, as a result of disengagement of the one engagement parts or the one engagement members from the other engagement parts.

In the bellows with protective plate members according to the first invention, since each protective plate member is configured attachable and detachable to and from the fixing plate, as a result of engagement of the one engagement parts or the one engagement members respectively formed or arranged on the fixing plate, with the other engagement parts formed on the fitting plate part, and, as a result of disengagement of the one engagement parts or the one engagement members from the other engagement parts, so that the bellows with protective plate members now allows replacement of only damaged slat(s), rather than total replacement of the bellows, when damaged or deformed only in a part of a large number of fixed slats (protective plate member).

Note that the bellows body which configures the first invention will suffice if, at least, it has the ridge parts and the valley parts alternately formed therein, and is configured stretchable in the direction normal to the longitudinal direction of the ridge parts and the valley parts, and not always necessarily has formed thereon leg parts having the length in the direction normal to the ridge parts and the valley parts. Materials for composing the bellows supporting plate, the fixing plate and the protective plate member which configure this invention may be metal or resin, wherein the bellows supporting plate and the fixing plate preferably have suitable levels of rigidity and possibly smallest thickness, in view of minimizing the length of the bellows body in the most contracted state. The fixing plate fixed to the bellows body is not always necessarily used in such a way that a plurality of them are fixed in the widthwise direction of the bellows body (the longitudinal direction of the ridge parts and the valley parts) (see Claim 2), but may be used in such a way that only a single fixing plate is fixed to the bellows body (see Claim 4). It also suffices that the fixing plate is fixed at least to the bellows body, and may have a portion which extends from the fixed portion so as to be kept apart from the bellows body.

In the first invention, while the fixing plate necessarily has, formed or arranged thereon in the longitudinal direction thereof, a plurality of one engagement parts or one engagement members, and the fitting plate part necessarily has, formed thereon or around, a plurality of the other engagement parts which respectively engage with the one engagement parts or the one engagement members, there are no special limitations on the shapes and positional relations of the one engagement parts or the engagement member, and the other engagement part, so long as they are suitably shaped and structured for engagement. In addition, the bellows with protective plate members according to this invention, when attached to equipment or apparatus and driven by a driving system installed on the equipment, may stretch and contract not only in the horizontal direction, but also in the vertical direction.

A second invention (the invention described in Claim 2) is characterized in that, in the first invention, a plurality of the fixing plates are fixed in the widthwise direction of the bellows body, each of the one engagement parts formed on the fixing plates has a first engagement part, and a second engagement part formed spaced from the first engagement part in the widthwise direction of the fixing plate, each of the other engagement parts formed on the fitting plate part has a third engagement part which engages with the first engagement part when an external force is applied on the fitting plate part from the valley part side to the ridge part side; and a fourth engagement part which engages with the second engagement part when an external force is applied on the fitting plate part from the ridge part side to the valley part side, and the protective plate member is configured attachable and detachable to and from the fixing plate, as a result of engagement of the first engagement part with the third engagement part, and engagement of the second engagement part with the fourth engagement part, and, as a result of disengagement of the first engagement part from the third engagement part, and disengagement of the second engagement part from the fourth engagement part.

Since the bellows with protective plate members according to the second invention is configured so that the third engagement part, which engages with the first engagement part when an external force is applied on the fitting plate part from the valley part side to the ridge part side, is engaged with the first engagement part; and so that the fourth engagement part, which engages with the second engagement part when an external force is applied on the fitting plate part from the ridge part side to the valley part side, is engaged with the second engagement part, so that there will be no risk of accidental fall of the protective plate member from the bellows body, even if the bellows body is stretched and contracted repetitively.

The engagement of the first engagement part with the third engagement part, and the engagement of the second engagement part with the fourth engagement part are enabled by a structure which allows the engagement not only when the external force is applied on the fitting plate part from the valley part side to the ridge part side, and not only when the external force is applied on the fitting plate part from the ridge part side to the valley part side, but allows the engagement also in the widthwise direction (longitudinal direction of the ridge parts and the valley parts). With this structure, the protective plate member may accurately be positioned also in the widthwise direction of the bellows body, and will be attached in a more stable manner.

A third invention (the invention described in Claim 3) is characterized in that, in the second invention, either one of the fixing plate or the fitting plate part has, formed thereon, an elastic arm which energizes the fitting plate part or the fixing plate so as to keep them apart from each other, while constantly keeping the engagement of the first engagement part with the third engagement part, and the engagement of the second engagement part with the fourth engagement member.

In the bellows with protective plate members according to the third invention, on either the fixing plate or the fitting plate part, the elastic arm which energizes the fitting plate part so as to constantly keep the engagement of the first engagement part with the third engagement part, and the engagement of the second engagement part with the fourth engagement member, is formed on either the fixing plate or the fitting plate part. This not only makes it possible to effectively avoid a risk of accidental fall of the individual protective plate members attached to the fixing plate; but also to avoid a risk of loosening from the fixing plate during repetitive stretching and contraction of the bellows body, or when the bellows body is stretched or contracted instantaneously at a very high speed, a risk of generating noise or abnormal sound due to the loosening, and a risk of wearing of the individual engagement parts due to sliding contact between the first engagement part and the third engagement part, or between the second engagement part and the fourth engagement part.

The elastic arm which configures the third invention, which energizes the fitting plate part so as to constantly keep the engagement of the first engagement part with the third engagement part, and the engagement of the second engagement part with the fourth engagement member, may be formed on either the fixing plate or the fitting plate part. The number of the elastic arms is not specifically limited.

A fourth invention (the invention described in Claim 4) is characterized in that, in the first invention, the fixing plate is configured as a single plate having the length in the widthwise direction of the bellows body, each of the one engagement parts or the one engagement members has a shaft part having the top end thereof protruded out from the surface of the fixing plate, and a disk part formed at the top end of the shaft part, the fitting plate part has, formed therein as the other engagement part, engagement holes with which the shaft part which configures each engagement part or each engagement member engages, and each engagement hole has a disk part insertion hole through which the disk part is inserted, and an oblong shaft part insertion hole through which the shaft part is inserted, being formed so as to communicate with the disk part insertion hole and to extend from the disk part insertion hole in the widthwise direction of the bellows body.

In the bellows with protective plate members according to the fourth invention, each of the one engagement parts or the one engagement members which configures the first invention has a shaft part having the top end thereof protruded out from the surface of the fixing plate, and a disk part formed at the top end of the shaft part; the fitting plate part has, formed therein as the other engagement parts, engagement holes with which the shaft part which configures each engagement part or each engagement member engages; and each of the engagement hole has a disk part insertion hole through which the disk part is inserted, and an oblong shaft part insertion hole through which the shaft part is inserted, being formed so as to communicate with the disk part insertion hole and to extend from the disk part insertion hole in the widthwise direction of the bellows body. This makes the protective plate member attachable and detachable to and from the fixing plate, as a result of engagement of the engagement part or engagement member with the engagement hole, and as a result of disengagement of the engagement part or the engagement member, from the engagement hole.

In particular, in the bellows with protective plate members according to the fourth invention, the engagement hole has a disk part insertion hole through which the disk part is inserted, and an oblong shaft part insertion hole through which the shaft part is inserted, being formed so as to communicate with the disk part insertion hole and to extend from the disk part insertion hole in the widthwise direction of the bellows body. Accordingly, when attaching the fitting plate part to the fixing plate, first, the disk part which configures the engagement part or engagement member is inserted through the disk part insertion hole which configures the engagement hole, then, the protective plate member having the fitting plate part as a constituent is slid along the shaft part insertion hole, making the shaft part move in the shaft part insertion hole, thereby (the shaft part which configures) the engagement part or engagement member, as the one engagement part or one engagement member, is engaged with the engagement hole (shaft part insertion hole) as the other engagement part. Since each shaft part insertion hole is formed so as to extend from the disk part insertion hole in the widthwise direction of the bellows body (that is, the shaft part insertion hole has the length in the widthwise direction of the bellows body), so that the protective plate member is restricted to move, relative to the fixing plate, in the direction of stretching and contraction of the bellows body, or, from the ridge part side to the valley part side, or from the valley part side to the ridge part side, and owing to the disk part, also restricted to move in the direction away from the fixing plate. According to the fourth invention, the protective plate member may therefore be attached in a stable manner.

The engagement part which configures the fourth invention is configured so that the shaft part is fixed so as to rise up from the surface of the fixing plate, and that the disk part is fixed to the top end of the shaft part. The engagement member has at least the shaft part and the disk part as the constituents, configured as a member independent from the fixing plate, and can therefore demonstrate the same operation and effect when configured either in the form of engagement part, or in the form of engagement member.

A fifth invention (the invention described in Claim 5) is characterized in that, in the fourth invention, any one of the plurality of engagement holes has a stopper tongue provided so as to partially close the disk part insertion hole which configures the engagement hole, the stopper tongue being capable of causing elastic deformation in the front end thereof so as to deflect away from the bellows body, when applied with an external force; and capable of causing elastic deformation in the front end thereof underneath the disk part thereby returned back to the original position, when the disk part which configures the engagement member is inserted through the disk part insertion hole which configures the engagement hole, and the shaft part is slid while guided by the shaft part insertion hole.

In the bellows with protective plate members according to the fifth invention, since the stopper tongue is contained as a constituent, so that it now becomes possible to effectively avoid a risk of unintended shifting of the protective plate member, having the fitting plate part as a constituent, in the widthwise direction of the bellows body.

A sixth invention (the invention described in Claim 6) is characterized in that, in the fourth invention, the length of the individual shaft part insertion holes which configure the plurality of engagement holes formed in the fitting plate part successively increases in the longitudinal direction of the fitting plate part, and the protective plate member is configured attachable and detachable to and from the fixing plate, as a result of engagement of all engagement parts or all engagement members fixed or attached to the fixing plate, with all engagement holes formed in the fitting plate part, in such a way that, inserting the disk part which configures a specific engagement part or engagement member fixed or attached to the fixing plate part, into a specific engagement hole having the longest shaft part insertion hole, and inserting the shaft part which configures the specific engagement part or engagement member into the oblong shaft part insertion hole; next, inserting the disk part which configures the other engagement part or engagement member adjacent to the specific engagement part or engagement member, into the other engagement hole adjacent to the specific engagement hole, and inserting the shaft part which configures the specific engagement part or engagement member into the oblong shaft part insertion hole; or, as a result of disengagement of all engagement parts or all engagement members, from all engagement holes formed in each fitting plate part, conducted in an inverted way.

Since the bellows with protective plate members according to the sixth invention is thus configured, when the fitting plate part of the protective plate member is attached to the fixing plate, it is no more necessary to insert, at the same time, all disk parts which configure the engagement part or the engagement member formed or attached on the fixing plate, with all disk part insertion holes which configure the engagement hole formed in the fitting plate part. Instead, the attachment may be conducted successively, in such a way that inserting the disk part which configures a specific engagement part or engagement member fixed or attached to the fixing plate part, into a specific engagement hole having the longest shaft part insertion hole, and inserting the shaft part which configures the specific engagement part or engagement member into the oblong shaft part insertion hole; next, inserting the disk part which configures the other engagement part or engagement member adjacent to the specific engagement part or engagement member, into the other engagement hole adjacent to the specific engagement hole, and inserting the shaft part which configures the specific engagement part or engagement member into the oblong shaft part insertion hole. Meanwhile, the attached protective plate member may be detached in such a way that drawing the disk part sequentially out from the specific engagement hole having the shortest shaft part insertion hole.

According to the bellows with protective plate members of the sixth invention, attachment of the protective plate member to the fixing plate, and detachment of the protective plate member having been attached to the fixing plate, may be conducted sequentially from one end or from the other end of the fitting plate part or the protective plate member, and this greatly improves the workability of both processes.

A seventh invention (the invention described in Claim 7) is characterized in that, in any one of the fourth, fifth and sixth inventions, the engagement member has, fixed to the bottom end of the shaft part thereof, a lower disk part which is shaped identically with the disk part, with the upper surface thereof faced to the bottom face of the disk part, the fixing plate has, formed therein and arranged in the longitudinal direction thereof, a plurality of nearly Y-shaped oblong holes, and a portion surrounded by each oblong hole forms a resilient tongue which is capable of causing, when applied with an external force, elastic deformation in the front end thereof so as to deflect towards the back face side or the top face side of the fixing plate, forming an opening larger than the outside dimension of the disk part or lower disk part which configures the engagement member, and, capable of allowing, when returned back to the original position, the engagement member to be fixed to the fixing plate, while keeping the shaft part positioned on the front end side of the resilient tongue.

In the seventh invention, by allowing the resilient tongue, which is a portion surrounded by the nearly Y-shaped oblong hole, to cause elastic deformation when applied with an external force on the front end thereof so as to deflect towards the back face side or the top face side of the fixing plate, and by forming an opening larger than the outside dimension of the disk part or lower disk part which configures the engagement member, it now becomes possible to insert either the disk part or the lower disk part, and the shaft part through the opening. By returning the resilient tongue again back to the original position, the engagement member is fixed to the fixing plate, while keeping the shaft part positioned on the front end side of the resilient tongue. That is, the engagement member which configures the seventh invention is independent from the fixing plate, and is attached to the fixing plate by exerting an external force to cause elastic deformation in the front end towards the back face side or top face side of the fixing plate, thereby producing an opening which is larger than the outside dimension of the disk part or lower disk part composing the engagement member, allowing the resilient tongue to return back to the original position, and thereby positioning the shaft part on the front end side of the resilient tongue. The length of the shaft part is selected at least longer than the total of the thickness of the fixing plate and the thickness of the fitting plate part.

According to the bellows with protective plate members of the seventh invention, the engagement member may easily be attached to the fixing plate, the attached engagement member will have a stabilized strength and may be used stably over a long period, and if any of the engagement members attached to the fixing plate should be damaged, only the damaged attached member may suitably be replaced, while keeping the fixing plate fixed to the bellows body.

Advantageous Effects of Invention

According to the first invention (the invention described in Claim 1), as a result of disengagement of the one engagement parts or the one engagement members formed or arranged on the fixing plate, from the other engagement parts formed on the fitting plate part, the bellows with protective plate members now allows replacement of only damaged slat(s), rather than total replacement of the bellows, when damaged or deformed only in a part of a large number of fixed protective plate members (slats).

According to the bellows with protective plate members of the second invention (the invention described in Claim 2), since it is configured so that the third engagement part engages with the first engagement part when an external force is applied on the fitting plate part from the valley part side to the ridge part side; and so that the fourth engagement part engages with the second engagement part when an external force is applied on the fitting plate part from the ridge part side to the valley part side, so that there will be no risk of accidental fall of the protective plate member from the bellows body, even if the bellows body is stretched and contracted repetitively.

According to the bellows with protective plate members of the third invention (the invention described in Claim 3), by virtue of the elastic arm, the bellows not only makes it possible to effectively avoid a risk of accidental fall of the individual protective plate members attached to the fixing plate; but also to avoid a risk of loosening from the fixing plate during repetitive stretching and contraction of the bellows body, or when the bellows body is stretched or contracted instantaneously at a very high speed, a risk of generating noise or abnormal sound due to the loosening, and a risk of wearing of the individual engagement parts due to sliding contact between the first engagement part and the third engagement part, or between the second engagement part and the fourth engagement part.

According to the bellows with protective plate members of the fourth invention (the invention described in Claim 4), the protective plate member is restricted to move, relative to the fixing plate, in the direction of stretching and contraction of the bellows body, or, from the ridge part side to the valley part side, or from the valley part side to the ridge part side, and owing to the disk part, also restricted to move in the direction away from the fixing plate. As a consequence, the protective plate member may therefore be attached in a stable manner.

According to the bellows with protective plate members of the fifth invention (the invention described in Claim 5), since the stopper tongue is contained as a constituent, so that it now becomes possible to effectively avoid a risk of unintended shifting of the protective plate member, having the fitting plate part as a constituent, in the widthwise direction of the bellows body.

According to the bellows with protective plate members of the sixth invention (the invention described in Claim 6), attachment of the protective plate member to the fixing plate, and detachment of the protective plate member having been attached to the fixing plate, may be conducted sequentially from one end or from the other end of the fitting plate part or the protective plate member, and this greatly improves the workability of both processes.

According to the bellows with protective plate members of the seventh invention (the invention described in Claim 7), the engagement member may easily be attached to the fixing plate, the attached engagement member will have a stabilized strength and may be used stably over a long period, and if any of the engagement members attached to the fixing plate should be damaged, only the damaged attached member may suitably be replaced, while keeping the fixing plate fixed to the bellows body.

DESCRIPTION OF EMBODIMENTS

Best modes for carrying out this invention will be detailed, referring to the attached drawings.

Figure 1:
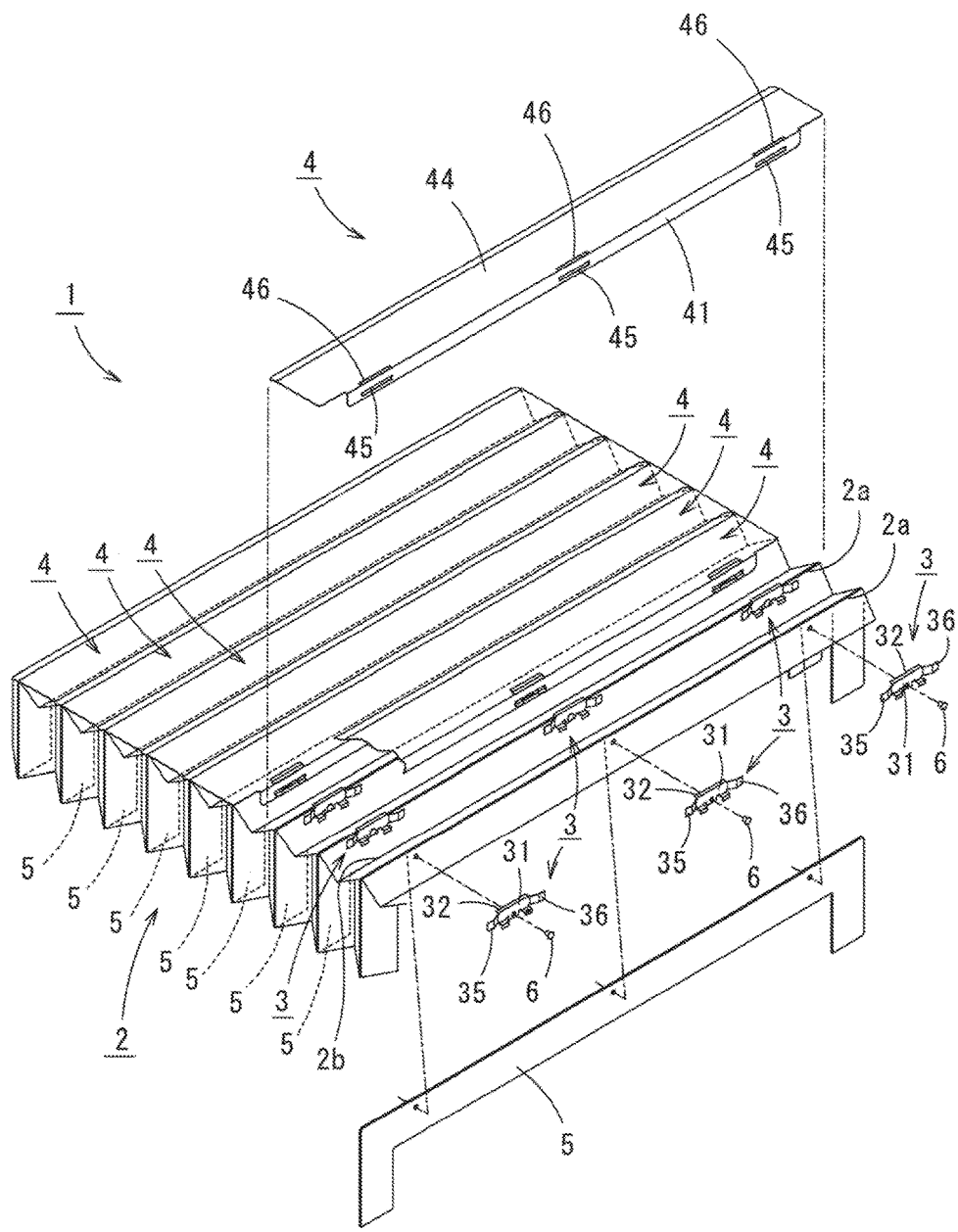
FIG. 1 is a partially exploded perspective view illustrating a bellows with protective plate members according to a first embodiment of this invention.

The bellows with protective plate members 1 according to the first embodiment has, as illustrated in FIG. 1, a bellows body 2, a plurality of fixing plates 3 attached to the bellows body 2, and protective plate members 4 detachably attached to these fixing plates 3.

The bellows body 2 is formed by pleating a resin sheet such as synthetic leather sheet, so as to alternately form ridge parts 2a and valley parts 2b, and has a main stretching/contraction part (reference sign not given) so that the ridge parts 2a and valley parts 2b respectively have the length in the horizontal direction, a left leg portion (reference sing not given) formed on the left side of the main stretching/contraction part and having the ridge parts 2a and the valley parts 2b alternately formed therein in the vertical direction (the direction normal to the ridge parts 2a), and a right leg portion formed on the right side of the main stretching/contraction part and having unillustrated ridge parts and the valley parts alternately formed therein in the vertical direction. In other words, the bellows body 2 of this embodiment is a so-called portal bellows configure by the main stretching/contraction part positioned horizontally, and the left leg portion and the right leg portion positioned on both lateral sides of the main stretching/contraction part. Inside the bellows body 2 which configures this embodiment, bellows supporting plates 5 are respectively fixed. These bellows supporting plates 5 are shaped in plates using a resin, respectively fixed inside the bellows body, while positioning the individual upper edges thereof in the vicinity of the back face of the ridge parts, have the width nearly equal to the width of each of the ridge parts 2a, and have the height nearly equal to the height of the left leg portion and the right leg portion.

Figure 2:
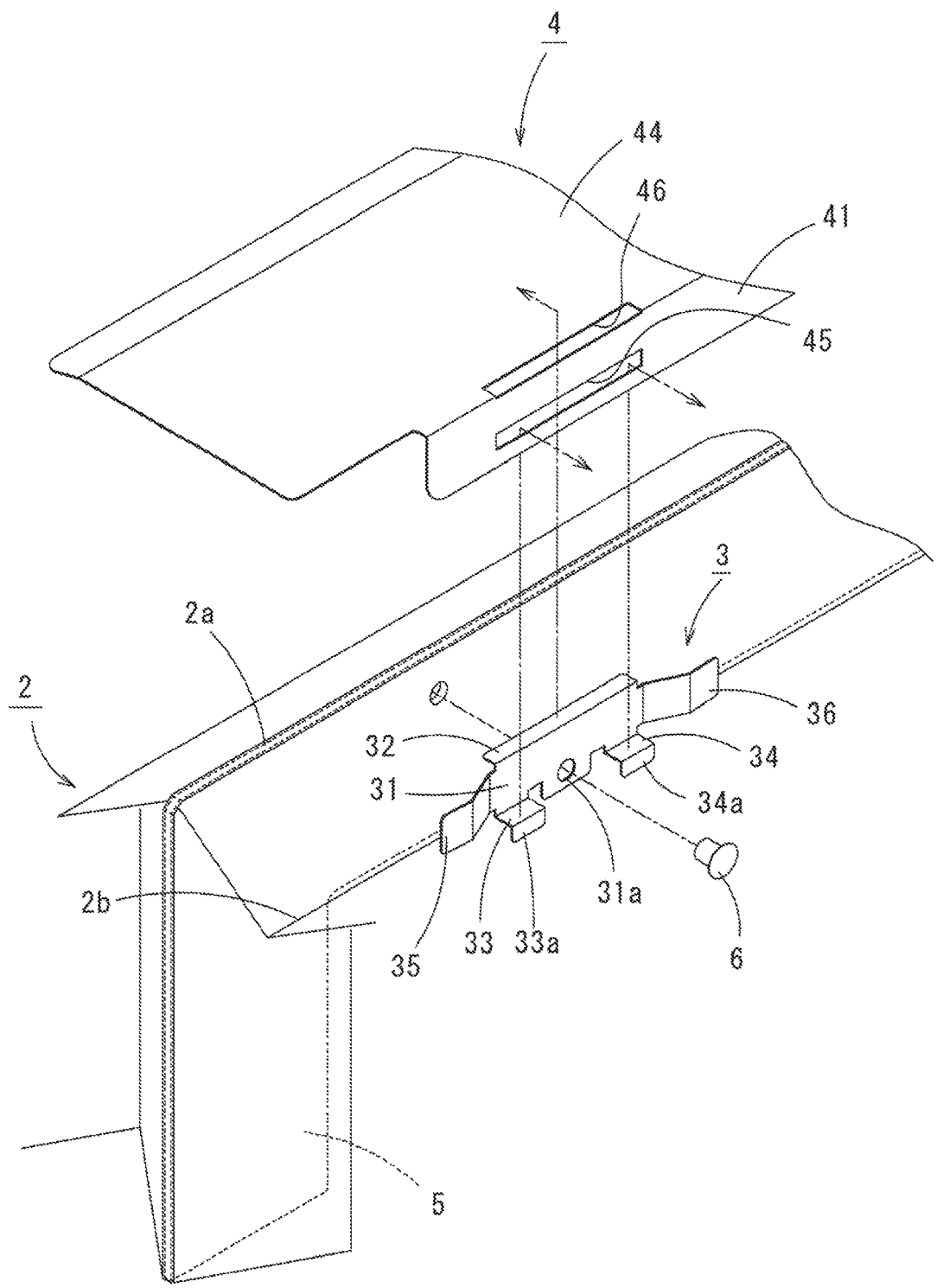
FIG. 2 is an exploded perspective view illustrating a fixing plate fixed to the bellows body, disassembled from a protective plate member.
Figure 3:
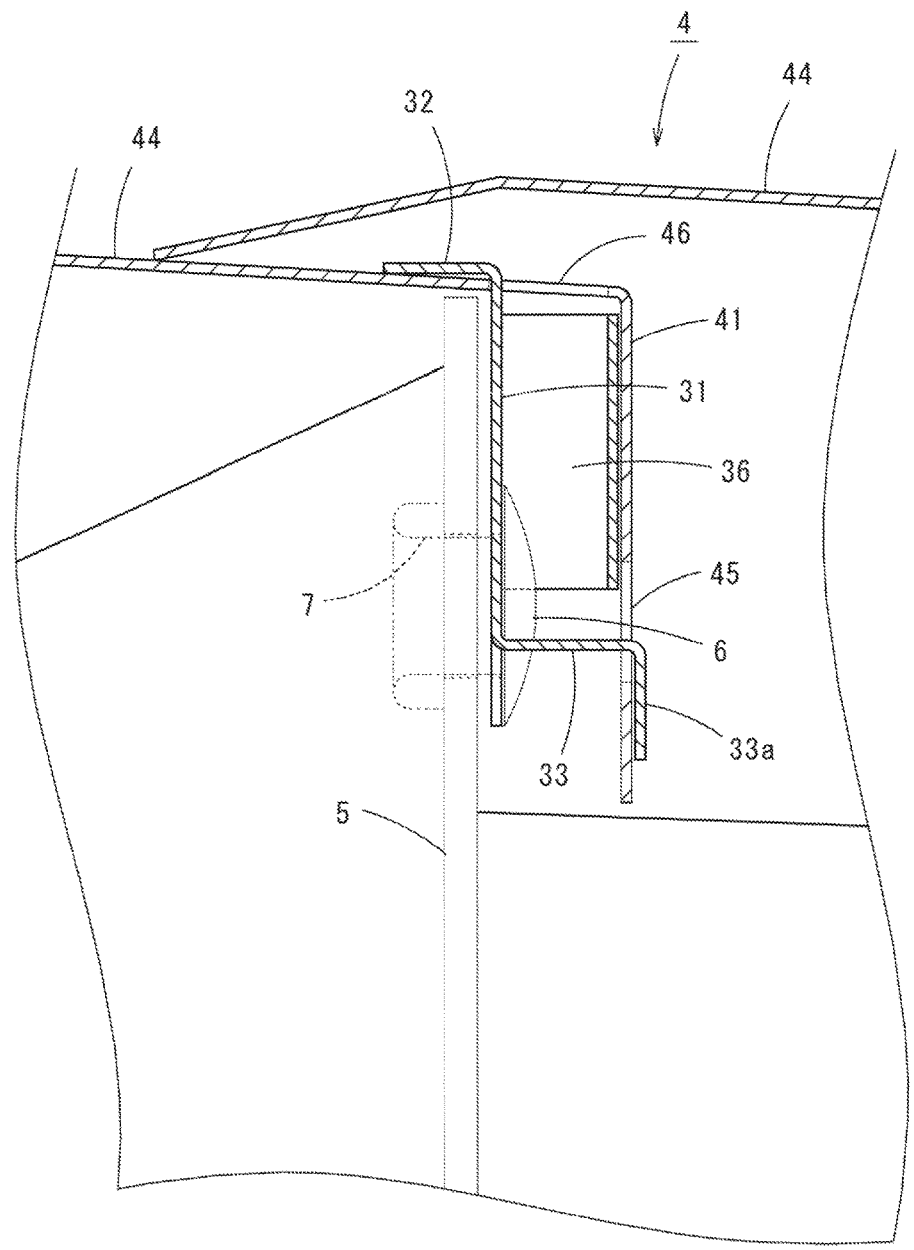
FIG. 3 is a cross sectional view illustrating a protective plate member fixed to the fixing plate.

Outside the bellows body 2 (excluding both ends of the bellows body 2.) and in the vicinity of each ridge part 2a which composes the bellows body 2, three fixing plates 3 are fixed in the widthwise direction of the bellows body 2. The fixing plates 3 are made of stainless steel, have the same shape, and as illustrated in enlargement in FIG. 2, and each of which has a fixing plate part 31 fixed to the bellows body 2, and a bent plate part 32 which is formed by folding one side of the fixing plate part 31 nearly at right angles. At the center of the fixing plate part 31, a circular opening 31a for allowing insertion of a rivet is formed. Each of the bellows body 2 and the bellows supporting plate 5 has formed therein openings (reference signs not given) through which the rivets are inserted, at positions corresponded to the openings 31a. The fixing plate part 3 is fixed, as illustrated in FIG. 3, by the one and the other rivets 6, 7 to the bellows supporting plate 5, while holding the bellows body 2 in between.

On the other side of the fixing plate part 31 which configures the fixing plate 3 (on the side opposite to the position where the bent plate part 3b is formed), there is formed a first engagement plate part 33 on the left, and a second engagement plate part 34 on the right, respectively so as to rise up from the fixing plate part 31. The first and second engagement plate parts 33, 34 are respectively the one engagement parts which configure this invention, and also first engagement parts. In the bellows with protective plate members 1 according to this embodiment, the first engagement plate part 33 and the second engagement plate part 34 have, respectively formed on the front ends thereof, stopper plate parts 33a, 34a which are bent so that the respective front ends point the valley parts 2b which configure the bellows body 2.

The fixing plate part 31 which configures the fixing plate 3 has one elastic arm 35 formed on the left, and other elastic arm 36 formed on the right. These one and the other elastic arms 35, 36 energize the fixing plate 3 and a fitting plate part 41 described later, so as to keep them apart from each other, while constantly keeping the engagement of the first engagement plate part 33 and the second engagement plate part 34 with a first engagement hole 45 described later, and the engagement of the bent plate part 32 with a second engagement hole 46 described later.

The bent plate part 32 is one engagement part which configures this invention, and also a second engagement part, the length of which is same as that of the fixing plate part 31, and the width of which is short only enough to cover each ridge part 2a formed in the bellows body 2.

Each protective plate member 4 is made of stainless steel, and is configured by a fitting plate part 41 having the width approximately same as that of the fixing plate 3 and the length slightly shorter than the width of the bellows body 2, and a protective plate part 44 which extends from the fitting plate part 41 across the folded part 43. On the front edge side of the fitting plate part 41 (on the side opposite to the protective plate part 44), there are formed (pierced) first engagement holes 45 with which both of the first engagement plate parts 33 and the second engagement plate parts 34, which configure the first engagement part of this invention, are engaged. The first engagement holes 45 are the other engagement part which configure this invention, and also are the third engagement part. Each of the first engagement holes 45 has a width enough to allow insertion of the first engagement plate part 33 and second engagement plate part 34, and the stopper plate parts 33*a*, 34*a* which are formed respectively at the front edges of the first engagement plate part 33 and the second engagement plate part 34. At the boundary between the fitting plate part 41 and the protective plate part 44 which configure the protective plate member 4, there are formed (pieced) second engagement holes 46 through which the bent plate parts 32 formed in the fixing plate 3 are inserted, and with which the bent plate parts 32 are engaged. The second engagement holes 46 are the other engagement part which configure this invention, and also are the fourth engagement part.

The protective plate part 44 has a length slightly longer than the width of the bellows body 2, and has a width slightly longer than the distance between two adjacent ridge parts 2*a*, 2*a* when the bellows body 2 is stretched to the maximum. In the bellows with protective plate members 1 of this embodiment, the middle part of the protective plate part 44 on the front edge side thereof is bent so that the front edge of the protective plate part 44 points the bellows body 2, so as to prevent grinding chips or work debris from entering beneath the protective plate part 44 towards the valley parts 2*b* of the bellows body 2, as the bellows body 2 repeats stretching and contraction.

Hence, according to the bellows with protective plate members 1 according to the first embodiment, it now becomes possible to attach the protective plate members 4 to the fixing plates 3 which are fixed to the bellows body, by engaging the first and second engagement plate parts 33, 34 formed in the fixing plate 3 with the first engagement holes 45 formed in the fitting plate part 41 which configures the protective plate member 4, and by engaging the bent plate parts 32 with the second engagement hole 46, and it now also becomes possible to detach the protective plate members 4 from the fixing plates 3, by disengaging the first engagement plate parts 33 and second engagement plate parts 34 from the first engagement holes 45, and disengaging the bent plate parts 32 from the second engagement holes 46. Accordingly, the bellows with protective plate members 1 now allows replacement of only damaged slat(s), rather than total replacement of the bellows, when damaged or deformed only in a part of a large number of fixed protective plate members (slats).

In particular, according to the bellows with protective plate members 1 of the first embodiment, engagement of the first engagement plate part 33 and the second engagement plate part 34 with the first engagement hole 45 is established, as illustrated in FIG. 3, when the external force is applied on the fitting plate part 41 in the direction from the valley parts 2*b* to the ridge parts 2*a* which are formed in the bellows body 2; and engagement of the bent plate part 32 and the second engagement hole 46 is established when the external force is applied on the fitting plate part 41 conversely in the direction from the ridge parts 2*a* to the valley parts 2*b* which are formed in the bellows body 2, so that there will be no risk of accidental fall of the protective plate member 4 from the bellows body 2, even if the bellows body 2 is stretched and contracted repetitively. Moreover, according to the bellows with protective plate members 1 of the first embodiment, the first and second engagement plate parts 33, 34 which respectively engage with the first engagement hole 45 have, respectively formed on the front edges thereof, the stopper plate parts 33*a*, 34*a* which are bent so that the front edges thereof respectively points the valley parts 2*b* which compose the bellows body 2. Hence, there will be a more reduced risk of falling of the protective plate member(s) 4 from the bellows body 2.

Moreover, according to the bellows with protective plate members 1 of the first embodiment, since the fixing plate 3 is provided with the elastic arms 35, 36, so that it becomes possible not only to avoid a risk of accidental fall of the individual protective plate members 4 attached to the fixing plate 3; but also to avoid a risk of loosening of the protective plate member 4 from the fixing plate 3 during repetitive stretching and contraction of the bellows body 2, or when the bellows body 2 is stretched or contracted instantaneously at a very high speed, a risk of generating noise or abnormal sound due to the loosening, and a risk of wearing of the individual engagement parts due to sliding contact between the first engagement plate part 33 and the second engagement plate part 34 with the first engagement hole 45, and between the bent plate part 32 and the second engagement hole 46.

Note, while the bellows with protective plate members 1 of the first embodiment has been explained referring to the illustrated example in which the elastic arms, which configure this invention, are formed on each fixing plate 3, the elastic arms which configure this invention may alternatively be formed or fixed on the back face of the fitting plate part 41 which configures the protective plate member 4. In an exemplary bellows with protective plate members 1 of this embodiment having been described above, the first and second engagement plate parts 33, 34 as one engagement parts which configures this invention are formed in the fixing plate 3; the first engagement hole 45 (as the other engagement part which configures this invention) which engages with the first and second engagement plate parts 33, 34 is formed in the fitting plate part 41; the bent plate part 32 as one engagement part which configures this invention is formed in the fixing plate 3; and the second engagement hole 46 with which the bent plate part 32 is engaged is formed as the other engagement part which configures this invention, in the vicinity of the fitting plate part 41. However, it is alternatively possible to form, as the other engagement part which configures this invention, the first and second engagement plate parts 33, 34 and the bent plate part 32 in the fitting plate part 41 or therearound; and to form, as the one engagement parts which configures this invention, the first and second engagement holes 45, 46, with which the first and second engagement plate parts 33, 34 and the bent plate part 32 are engaged, in the fixing plate 3.

Next, a bellows with protective plate members 51 according to a second embodiment of this invention will be detailed referring to the drawings.

Figure 4:
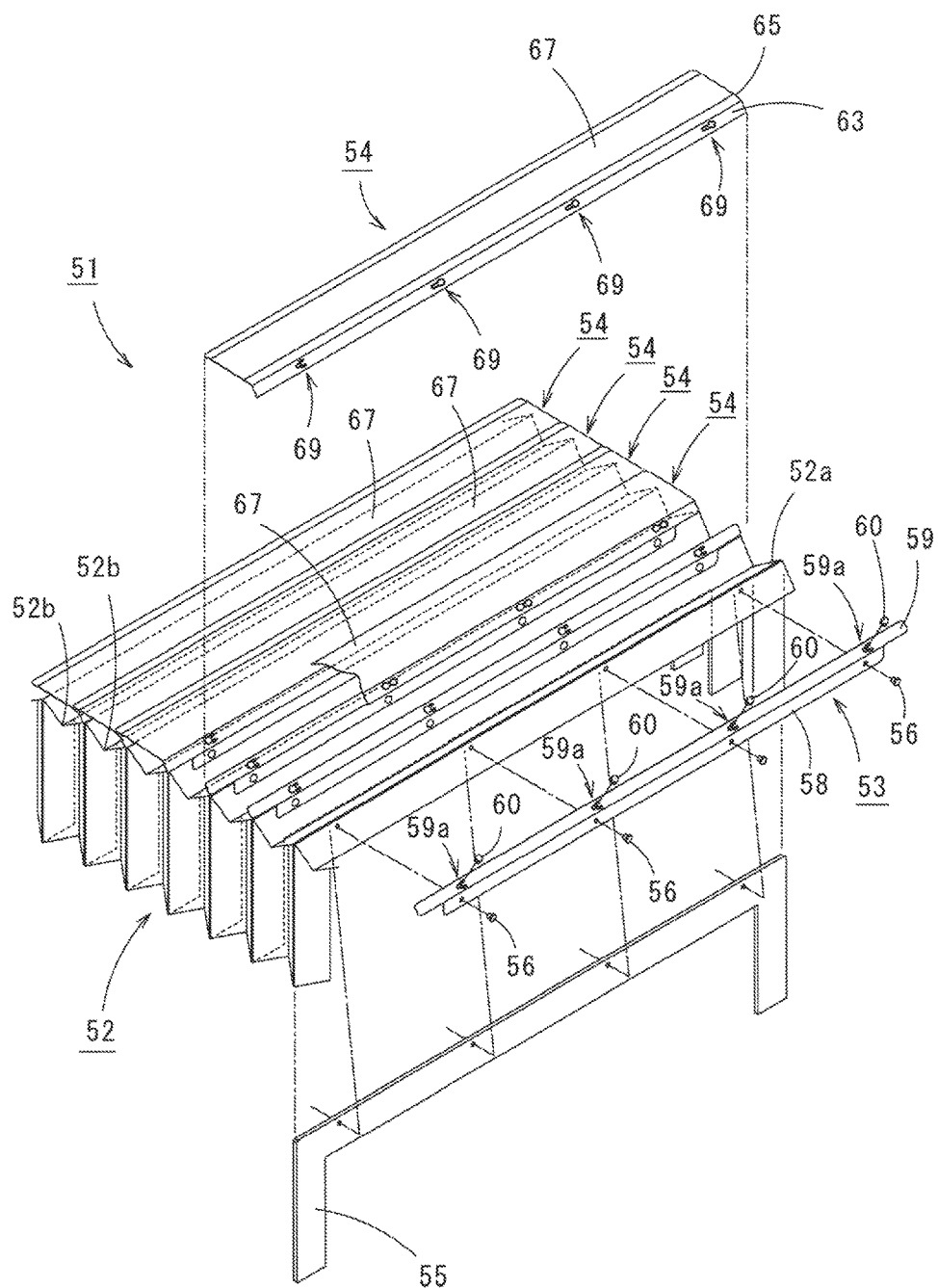
FIG. 4 is a partially exploded perspective view of the bellows with protective plate members according to a second embodiment of this invention.

The bellows with protective plate members 51 according to the second embodiment has, as illustrated in FIG. 4, a bellows body 52 which is shaped and configured identically with the above-described bellows body 2, a plurality of fixing plates 35 fixed to the bellows body 52, and protective plate members (slats) 54 individually attached to the fixing plate 53 in a detachable manner. Inside the bellows body 52, there are fixed bellows supporting plates 55 which are configured identically with the above-described bellows supporting plates 5.

Figure 5:
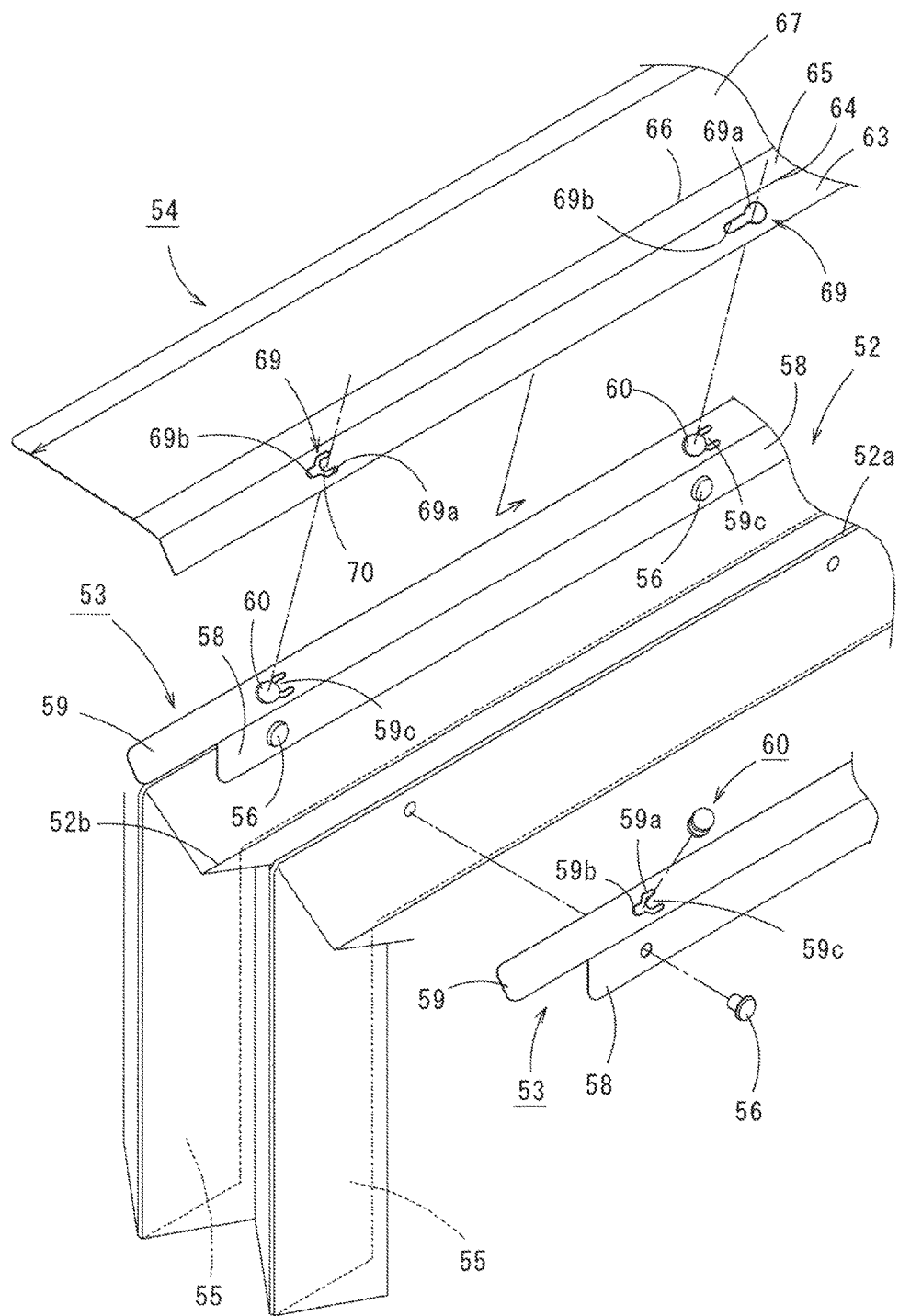
FIG. 5 is an enlarged perspective view of the bellows body, the fixing plate and the protective plate member.

In the bellows with protective plate members 51 according to the second embodiment, a single fixing plate 53 having the length in the widthwise direction of the bellows body 52 is fixed to each ridge part 52a. The mode of fixation of each fixing plate 53 to the bellows body 52 is same as the mode of fixation of the fixing plate 3, that is, fixed at four positions using one and the other rivets 56, 57. The fixing plate 53 is made of stainless steel, and as illustrated in FIG. 4 or FIG. 5, has a fixing plate part 58 which is fixed to the bellows body 52, and a bent plate part 59 which is formed by folding one side of the fixing plate part 58 nearly at right angles. In the bent plate part 59, there are formed, by punching the fixing plate 58, four oblong holes 59a each having an overall shape of Y, arranged in the longitudinal direction of the bent plate part 59, wherein to each of the oblong holes 59a, an engagement member 60 is attached. The oblong hole 59a has a portion formed into a near-U shape, and a short insertion hole 59b (see FIG. 5) which communicates with the near-U shaped portion, configured to guide therethrough the engagement member 60 from the U-shaped portion in the longitudinal direction of the bent plate part 59. A portion surrounded by such U-shaped oblong hole 59a is given as a resilient tongue 59c. The resilient tongue 59c is configured to cause elastic deformation, upon applied with external force through fingers of an operator or through a hand tool such as screwdriver, so as to deflect in the front end thereof towards the back face side of the top face side of the fixing plate 53. As described later, as a result of such elastic deformation, there is formed a hole through which an upper disk part 60a or a lower disk part 60c, which configures the engagement member 60 as described later can be inserted.

Figure 6:
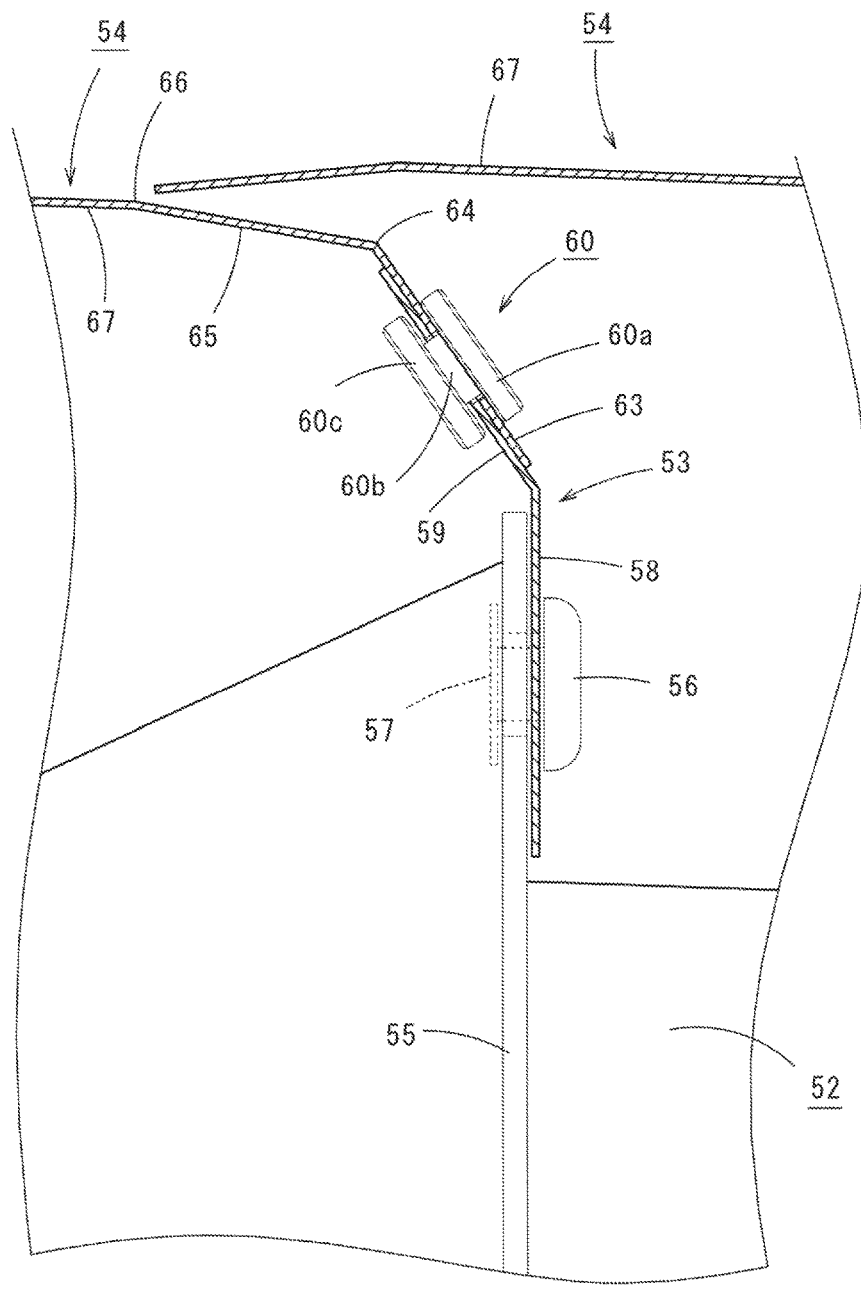
FIG. 6 is a cross sectional view illustrating the fixing plate attached with the protective plate member.
Figure 7:
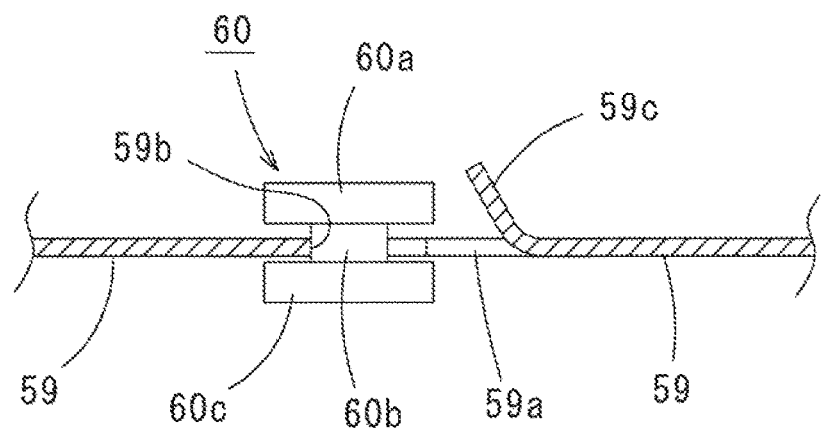
FIG. 7 is a cross sectional view illustrating a resilient tongue 59c whose front end under an external force is deflected by elastic deformation towards the top face side of a fixing plate 53.
Figure 8:
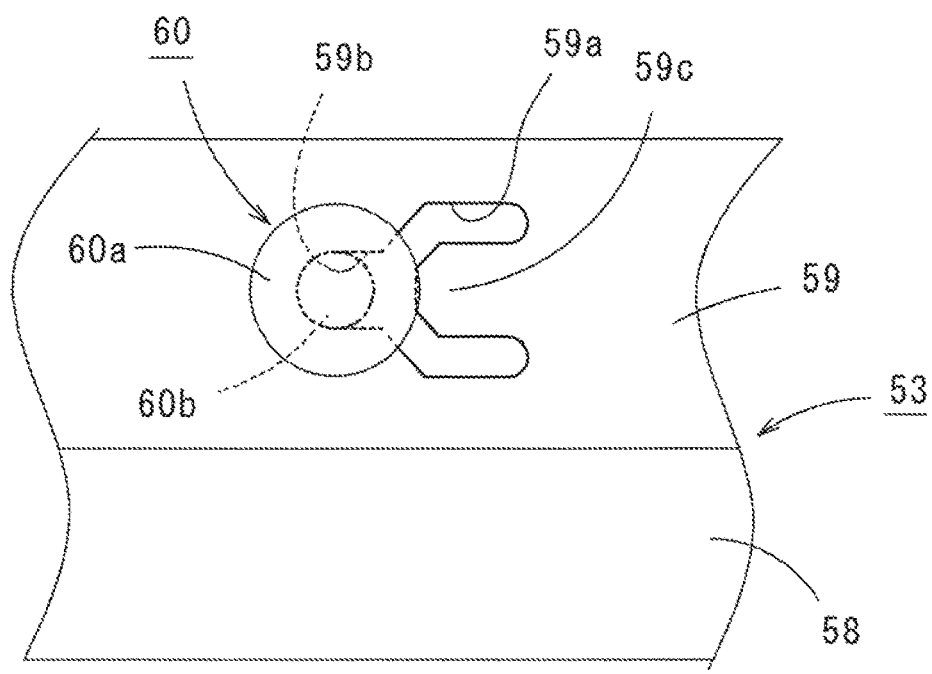
FIG. 8 is a plan view illustrating an engagement member attached to the fixing plate.

Meanwhile, each engagement member 60 has, as illustrated in FIG. 6, an upper disk part 60a formed in a disk shape, a shaft part 60b whose top end is welded to the center of the bottom face of the upper disk part 60a, and a lower disk part 60c which is fixed to the bottom end of the shaft part 60b, with the top face thereof opposed to the bottom face of the upper disk part 60a. The engagement member is the one engagement member which configures this invention, and, the upper disk part 60a is the disk part which configures this invention. The length of the shaft part 60b is at least longer than the total of the thickness of the fixing plate 53 and the thickness of (the fitting plate part of) the protective plate member 54. The engagement member 60 is attached to (the bent plate part 59 which composes) the fixing plate 53 in such a way that elastically deforming, as illustrated in FIG. 7, the resilient tongue 59c formed in the fixing plate 53 under the external force, so as to make the front end portion thereof point the back face side or front face side of the fixing plate 53; allowing the upper disk part 60a or lower disk part 60c which composes the engagement member 60 to pass through; and then allowing the resilient tongue 59a to return back to the original position, to thereby keep the engagement member 60, with the shaft part 60b thereof positioned in the insertion hole 59b on the front end portion of the resilient tongue 59a. In this mode of attachment of the engagement member 60, as illustrated in FIG. 6, the upper disk part 60a is positioned above the top face of the bent plate part 59, the lower disk part 60c is positioned beneath the back face of the bent plate part 59, and as illustrated in FIG. 8, the shaft part 60b is kept inserted in (the insertion hole 59b which communicates with) the oblong hole 59a, wherein the top and rear faces of the resilient tongue 59a are respectively aligned in the same planes with the top and rear faces of the bent plate part 59, and the front end portion of the resilient tongue 59a points the shaft part 60b.

The protective plate member 54 is made of stainless steel, formed to have an approximately same width with the width of the fixing plate 53, and is configured by a fitting plate part 63 having the length slightly shorter than the width of the bellows body 52, an inclined plate part 65 which extends from the fitting plate part 63 across the first folded part 64, and a protective plate part 67 which extends from the inclined plate part 65 across the second folded part 66.

In the fitting plate part 63, there are formed engagement holes 69 with which the individual engagement members 60 engage, which are aligned over the range from one end to the other end of the fitting plate part 63, and are formed by punching the fitting plate part 63. These engagement holes 69 are the other engagement part which configures this invention. Each of these engagement holes 69 is configured by, as illustrated in FIG. 5, a disk part insertion hole 69a through which the upper disk part 60a which composes the engagement member 60 is inserted, and a shaft part insertion hole 69b which communicates with the disk part insertion hole 69a, extends from the disk part insertion hole 69a in the longitudinal direction of the fitting plate part 63, and through which the shaft part 60b which configures the engagement member 60 is inserted. The length of the shaft part insertion hole 69b is at least equivalent to, or longer than, the diameter of the upper disk part 60a. In the bellows with protective plate members 51 of this embodiment, the disk part insertion hole 69a, which is formed in the fitting plate part 63 at one furthest end (or the other furthest end) out of all engagement holes 69, is partially closed with a stopper tongue 70. The stopper tongue 70 is surrounded by a nearly Y-shaped slit 69a (given the same reference sign as the disk part insertion hole 69a) which is formed by punching the fitting plate part 63 at the same time when the shaft part insertion hole 69b is formed, so as to communicate with the shaft part insertion hole 69b, and can provide the disk part insertion hole 69a which is made accessible after the operation described later. The stopper tongue 70 is configured to cause elastic deformation, upon applied with external force typically through fingers of an operator or through a hand tool such as screwdriver, so as to deflect the end portion thereof in the direction departing from the bellows body 52. As a result of such elastic deformation of the stopper tongue 70 applied with the external force, the slit 69a is transformed identically to the disk part insertion hole 69a. Accordingly, the engagement member 60 may be engaged with the engagement hole 69 having the stopper tongue 70 formed therein, by applying the external force to the stopper tongue 70 so as to cause upward elastic deformation, moving the upper disk part 60a which configures the engagement member 60 upward from the lower side of the fitting plate part 63 through the disk part insertion hole 69a, moving the shaft part 60b which configures the engagement member 60 upward, while being guided by the shaft part insertion hole 69b, in the direction departing from the disk part insertion hole 69a, and then returning the stopper tongue 70 back to the original position. When the stopper tongue 70 is returned back to the original position, the disk part insertion hole 69a is closed with the stopper tongue 70, with the front end thereof opposed to the circumferential face of the shaft part 60b, so as to restrict the engagement member 60 from escaping from the shaft part insertion hole 69b to the outside (into the disk part insertion hole 69a).

Accordingly, also the bellows with protective plate members 51 of the second embodiment allows replacement of only damaged slat(s), rather than total replacement of the bellows with protective plate members 51, when damaged or deformed only in a part of a large number of fixed protective plate members 54 fixed to the bellows body 52.

In particular, according to the bellows with protective plate members 51 of the second embodiment, since it suffices that, on the bent plate part 59 side of the fixing plate 53, the engagement members 60 are attached to the individual oblong holes 59a which are formed by punching the bent plate part 59, and since the individual insertion holes 69 are also formed, together with the stopper tongue 70, by punching the fitting plate part 63 of the protective plate member 54, so that the production cost may be reduced.

In the bellows with protective plate members 51 of the second embodiment, since the stopper tongue 70 is formed only in the engagement hole 69 positioned at one furthest end (or on the other furthest end) of the fitting plate part 63, out of all engagement holes 69, so that accidental fall of the protective plate member 54 may be avoidable, and this ensures a stable state of attachment.

While the bellows with protective plate members 51 of the second embodiment has been explained referring to an exemplary case where the engagement members 60, each of which is configured by the upper disk part 60a, the shaft part 60b and the lower disk part 60c, used as the engagement member which configures this invention, were attached to the bent plate part 59 which configures the fixing plate 53, such one engagement member which configures this invention may alternatively be configured as an unillustrated engagement part having the upper disk part 60a and the shaft part 60b, where the end of the shaft part 60b being fixed typically by welding to the top face of the bent plate part 59.

Next, a bellows with protective plate members 71 according to a third embodiment of this invention will be explained referring to the attached drawings.

Figure 9:
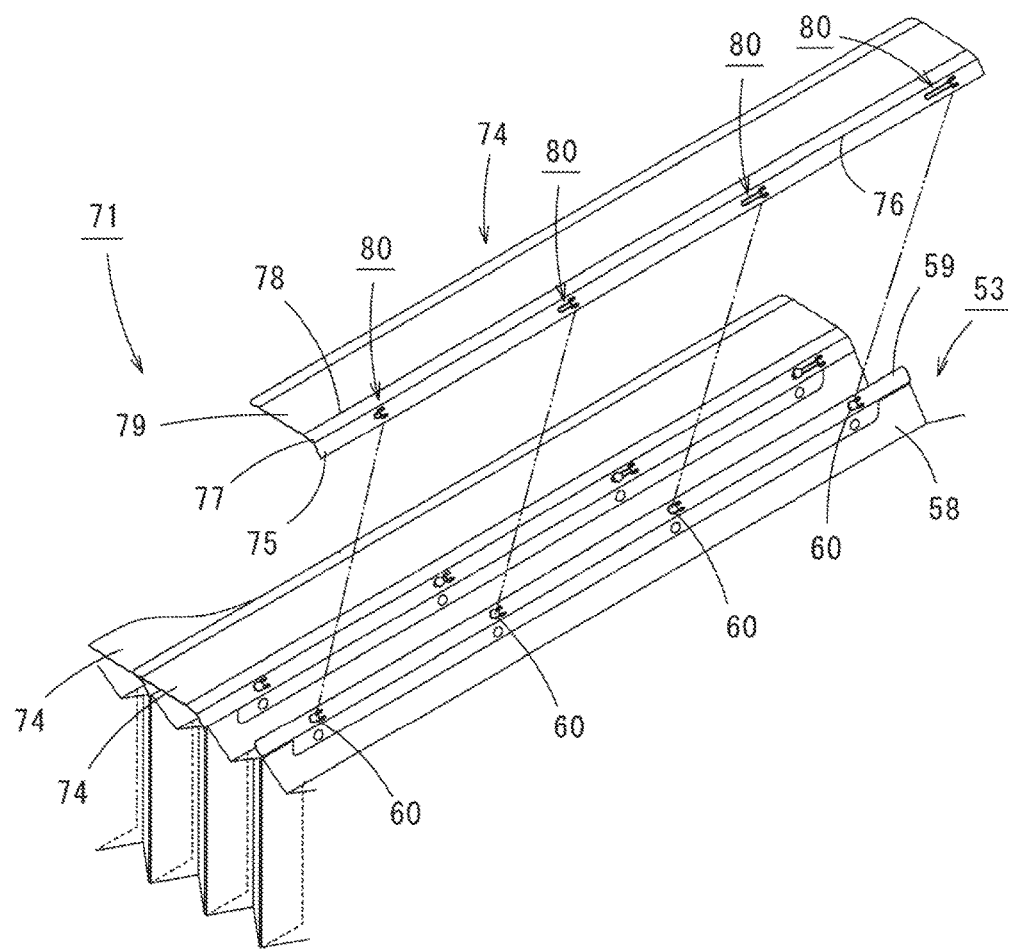
FIG. 9 is a partially exploded perspective view illustrating a bellows with protective plate members according to a third embodiment of this invention.
Figure 10:
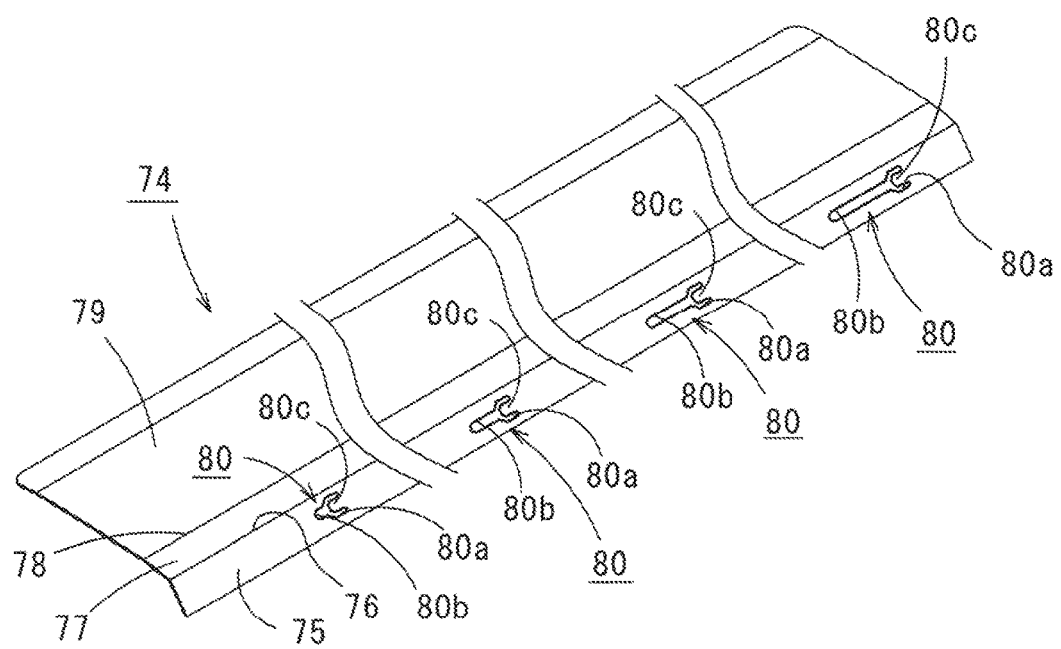
FIG. 10 is a perspective view illustrating engagement holes with different lengths formed in the protective plate member.

The bellows with protective plate members 71 of the third embodiment has, as a constituent, protective plate members 74 illustrated in FIG. 9, in place of the protective plate members 54 which configure the bellows with protective plate members 51 of the second embodiment (all constituents other than the protective plate member 54 which configures the bellows with protective plate members 71 of the third embodiment will be explained below, using the same reference signs.). That is, each protective plate member 74 is configured by a fitting plate part 75 which is formed to have an approximately same width with the width of the bent plate part 59 formed in the fixing plate 53, an inclined plate part 77 which extends from the fitting plate part 75 across the first folded part 76, and a protective plate part 79 which extends from the inclined plate part 77 across the second folded part 78. In the fitting plate part 75, there are formed engagement holes 80 with which the individual engagement members 60 engage, which are aligned over the range from one end to the other end of the fitting plate part 75, and are formed by punching the fitting plate part 75. Each of these engagement holes 80 is configured by, as illustrated in FIG. 10, a disk part insertion hole 80a through which the upper disk part 60a which composes the engagement member 60 is inserted, and a shaft part insertion hole 80b which communicates with the disk part insertion hole 80a, extends from the disk part insertion hole 80a in the longitudinal direction of the fitting plate part 75, and through which the shaft part 60b which configures the engagement member 60 is inserted. The disk part insertion hole 80a is partially closed with a resilient tongue 80c configured identically with the resilient tongue 59c explained previously.

The length of the shaft part engagement holes 80b of the individual engagement holes 80 which configure the bellows with protective plate members 71 of the third embodiment successively increases over the range from one end to the other end of the fitting plate part 75 (from the left to the right in FIG. 10), wherein the shaft part insertion hole 80b formed at one furthest end (on the left) of the fitting plate part 75 is made shortest, meanwhile the shaft part insertion hole 80b formed at the other furthest end (on the right) of the fitting plat part 75 is made longest. Difference of the length of the individual shaft part insertion holes 80b approximately ranges from the radius up to the diameter of the adjoining disk part insertion hole 80a.

Hence, according to the thus-configured bellows with protective plate members 71, the protective plate member 74 may be attached to the fixing plate 53, and the protective plate member 74 having been attached to the fixing plate 53 may be detached from the fixing plate 53, according to the operations explained below. That is, in the process of attachment of the protective plate member 74 to the fixing plate 53, the upper disk part 60a which configures the engagement member 60 attached to the other furthest end side (rightmost side in FIG. 9) of the fixing plate part 53, out of the engagement members 60 respectively attached to (the bent plate part 59 which configures) the fixing plate 53, is inserted into the disk part insertion hole 80a which configures the engagement hole 80 formed on the other furthermost end side of the fitting plate part 75, while causing elastic deformation of the resilient tongue 80c, and the protective plate member 74 is slid over a small distance (which approximately ranges from the radius up to the diameter of the disk part insertion hole 80a) towards the other end side of the protective plate member 74. By such operations, the shaft part 60b of the engagement member 60 inserted into the disk part insertion hole 80a approaches the shaft part insertion hole 80b or moves into the shaft part insertion hole 80b, and the disk part 60a which configures the other engagement member 60 adjacent to the engagement member 60 (attached to the other furthest end side of the fixing plate 53) is now positioned beneath the other engagement hole 80 adjacent to the engagement hole 80 formed on the other furthest end of the fitting plate part 75. Then, the disk part 60a which configures the other engagement member 60 is inserted into the disk part insertion hole 80a which configures the other engagement hole 80, while elastically deforming the resilient tongue 80a, and again the protective plate member 74 is slid over a small distance (which approximately ranges from the radius up to the diameter of the disk part insertion hole 80a) towards the other end side of the protective plate member 74. In this way, according to the bellows with protective plate members 71, by successively inserting the individual upper disk parts 60a into the disk part insertion holes 80a, all engagement members 60 may finally be engaged with the individual engagement holes 80. Meanwhile, when the protective plate member 74 having been attached to the fixing plate 53 is detached from the fixing plate 53, it suffices to reverse the procedures, in which the protective plate member 74 is moved to the other end side of the protective plate member 74, so as to bring the engagement member 60 having been located in the longest shaft part insertion hole 80b into the disk part insertion hole 80a, the upper disk part 60a is brought down under the protective plate member 74 and concurrently moved to one end side of the protective plate member 74. As a result of movement of the protective plate member 74 made by the operator, the other engagement member 60 next to the engagement member 60 having been positioned at the other furthest end side, is now located at a position where the disk part insertion hole 80*a* of the engagement hole 80, next to the specific engagement hole 80 having the longest shaft part insertion hole 80*b*, is formed, and the upper disk part 60*a* which configures the other engagement member 60 is moved downward through the disk part insertion hole 80*a* which configures the other engagement hole 80. In this way, all engagement members 60 are disengaged from all engagement holes 80.

In short, according to the bellows with protective plate members 71 of the third embodiment, unlike the bellows with protective plate members 51 of the second embodiment described previously, where the fixing plate 53 and the protective plate member 74 need be engaged, or the fixing plate 53 and the protective plate member 74 need be disengaged in one action, it now becomes possible to engage or disengage the fixing plate 53 and the protective plate member 74 sequentially from the one end or from the other end.

According to the bellows with protective plate members 71 of the third embodiment, as for the protective plate member 74 attached through the fixing plate 53 to the bellows body 52, there will be no risk of disengagement of the engagement members 60 from all of the individual engagement holes 80, even if the protective plate member 74 should move slightly towards the one end side of the fixing plate 53.

Next, a bellows with protective plate members 91 according to a fourth embodiment of this invention will be detailed referring to the attached drawings.

Figure 11:
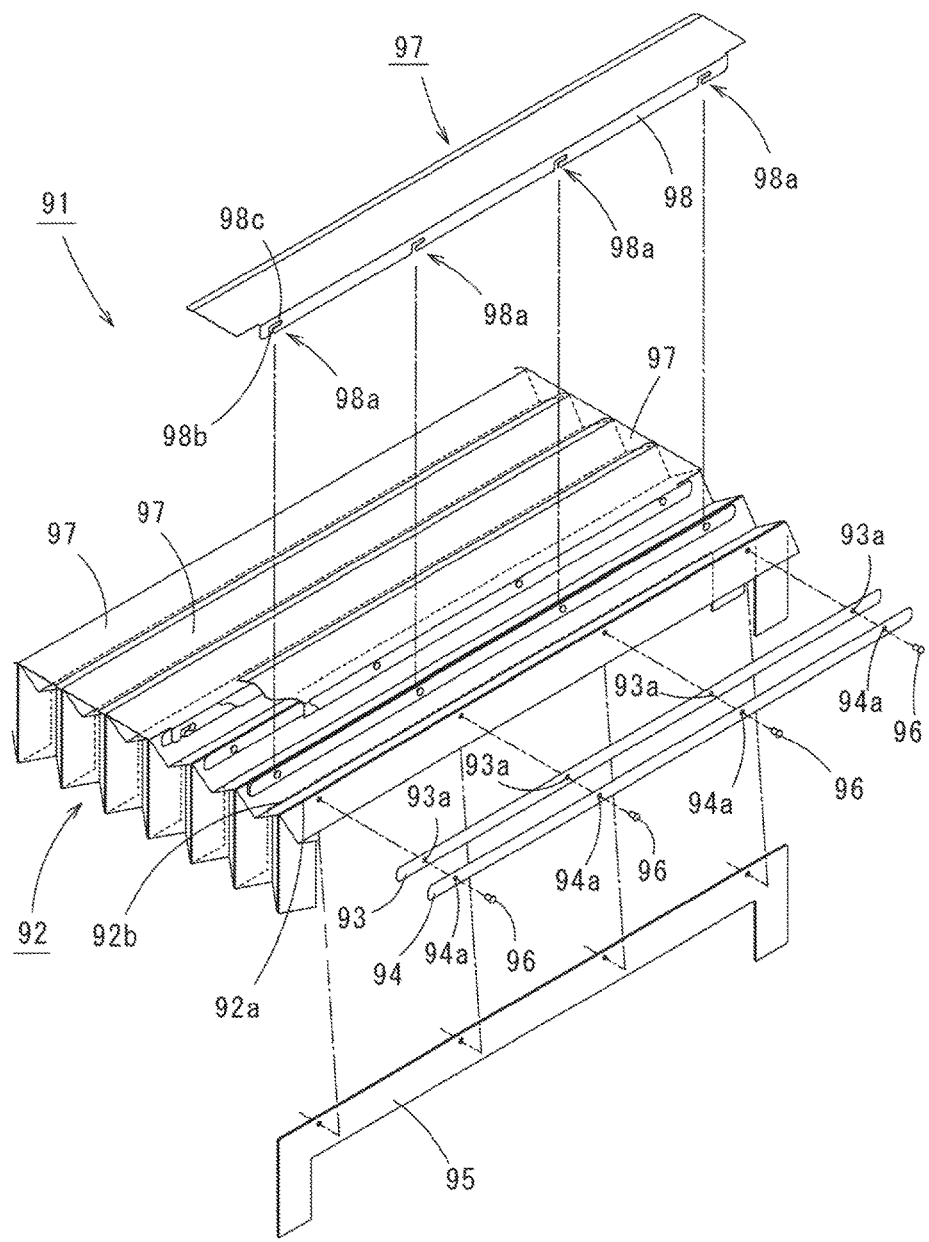
FIG. 11 is a partially exploded perspective view illustrating a bellows with protective plate members according to a fourth embodiment of this invention.
Figure 12:
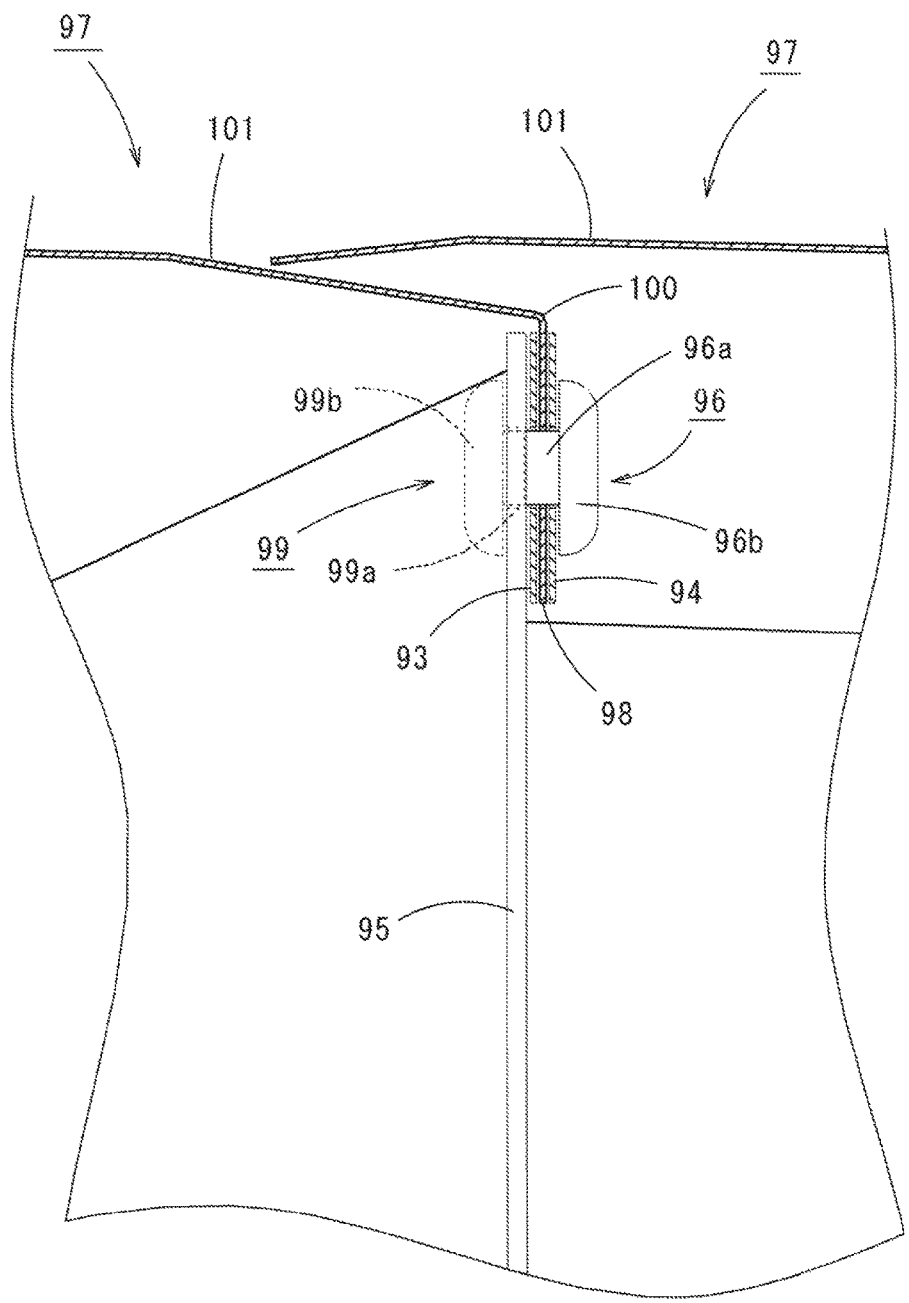
FIG. 12 is an enlarged cross sectional view illustrating a fitting plate part, which configures the protective plate member, attached between first and second fixing plates.

The bellows with protective plate members 91 of the fourth embodiment has, as illustrated in FIG. 11, a bellows body 92 which is shaped and configured identically with the bellows bodies 2, 52 explained previously; first and second fixing plates 93, 94 disposed in the vicinity of ridge parts 92*a* formed in the bellows body 92, and having the width in the direction of viewing valley parts 92*b* from the ridge parts 92*a*; four fixing shaft members 96 with which the first and second fixing plates 93, 94 are fixed to each bellows supporting plate 95 having been fixed inside the bellows body 92; and protective plate members 97 each having, as a constituent, a fitting plate part 98 having formed therein engagement holes 98*a* to be engaged respectively with the fixing shaft members 96.

The first and second fixing plate parts 93, 94 are plate members shaped identically to each other, and have the length in the widthwise direction of the bellows body 92. Each of the first and second fixing plate parts 93, 94 has four insertion holes 93*a*, 94*a* pierced therein. Each fixing shaft member 96 has a shaft part 96*a* to be inserted into insertion holes 93*a*, 94*a*, and a head 96*b* having a diameter larger than those of the shaft part 96*a* and the insertion holes 93*a*, 94*a*. In the bellows with protective plate members 91 of this embodiment, inner fixing shaft members 99 are fixed, from inside the bellows body 92, to the fixing shaft member 96. Each inner fixing shaft member 99 is configured by a shaft part 99*a* inside which the shaft part 96*a* is engaged, and a head 99*b* which is fixed to the base of the shaft part 99*a* and formed at the same time with the head 96*b*. With these heads 96*b*, 99*b* respectively possessed by the fixing shaft member 96 and the inner fixing shaft member 99, the bellows supporting member 95, (a fabric or sheet of) the bellows body 92, and the first and second fixing plate parts 93, 94 are fixed, while holding in between the fitting plate part 98 which configures the protective plate member 97, as explained below.

The protective plate member 97 has the fitting plate part 98 which is attached while being held in between by the first and second fixing plate parts 93, 94, and a protective plate part 101 which extends from the fitting plate part 98 across the folded part 100. The fitting plate part 98 has formed therein engagement holes 98*a* to be engaged with the the fixing shaft member 96 (or the shaft parts 99*a* of the inner fixing shaft member 99). Each engagement hole 98*a* is a notch formed (punched) into an L-shape, as illustrated in FIG. 11, and is configured by a vertical hole part (numerical reference is omitted) through which the fixing shaft member 96 (or the shaft parts 99*a* of the inner fixing shaft member 99) is inserted, and a horizontal hole part (numerical reference is omitted) which extends horizontally from the top end of the vertical hole part (numerical reference is omitted).

Also according to the above-described bellows with protective plate members 91 of the fourth embodiment, the fitting plate part 98 may be attached while being held between the first and second fixing plate parts 93, 94 as a result of engagement of the engagement holes 98*a* with the fixing shaft members 96 (or the shaft parts 99*a* of the inner fixing shaft member 99); and the protective plate member 97 may be detached from between the first fixing plate 93 and the second fixing plate 94, by disengaging the fixing shaft members 96 (or the shaft parts 99*a* of the inner fixing shaft member 99) from the engagement holes 98*a*. Accordingly, also the bellows with protective plate members 91 of the fourth embodiment allows replacement of only damaged slat(s), rather than total replacement of the bellows with protective plate members 91, when damaged or deformed only in a part of a large number of fixed protective plate members 97.

REFERENCE SIGNS LIST

1 bellows
2 bellows body
2*a* ridge parts
2*b* valley parts
3 fixing plate
4 protective plate member
5 bellows supporting plate
33 first engagement plate part
34 second engagement plate part
35 one elastic arm
36 the other elastic arm
41 fitting plate part
44 protective plate part
45 first engagement hole
46 second engagement hole
51 bellows with protective plate members
52 bellows body
53 fixing plate
55 bellows supporting plate
55*a* ridge parts
55*b* valley parts
59 bent plate part
59*an* oblong hole
59*c* resilient tongue
60 engagement member
60*a* upper disk part
60*b* shaft part
60*c* lower disk part
63 fitting plate part
67 protective plate part
69 engagement hole
69*a* disk part insertion hole (slit)

69b shaft part insertion hole
70 stopper tongue
71 bellows with protective plate members
74 protective plate member
75 fitting plate part
78 protective plate part
79 engagement hole
79a disk part insertion hole
79b shaft part insertion hole
91 bellows with protective plate members
92 bellows body
92a ridge parts
92b valley parts
93 first fixing plate
94 second fixing plate
95 bellows supporting plate
96 fixing shaft member
97 protective plate member
98 fitting plate part

The invention claimed is:

1. A bellows with protective plate members, the bellows comprising:
a bellows body having ridge parts and valley parts alternately formed therein, and being configured to be stretchable in a first direction that is normal to a second direction, the second direction being a longitudinal direction of the ridge parts and the valley parts;
bellows supporting plates fixed inside the bellows body such that each bellows supporting plate is vertically suspended from a corresponding one of the ridge parts;
fixing plates disposed outside the bellows body, each fixing plate being fixed to a corresponding one of the bellows supporting plates such that the bellows body is held in between the fixing plates and the bellows supporting plates; and
protective plate members, each protective plate member comprising a fitting plate part detachably attached to a corresponding one of the fixing plates, and a protective plate part which extends from the fitting plate part across a folded part so as to cover a top portion of the bellows body,
each fixing plate having at least one first engagement member formed therein or arranged thereon in a longitudinal direction thereof; and each fitting plate part having at least one second engagement member formed thereon or around, wherein the at least one second engagement member respectively engages with the at least one first engagement member, and
each protective plate member being attachable to and detachable from the corresponding one of the fixing plates fixed to the bellows supporting plates, as a result of engagement of the at least one second engagement member of the fitting plate part of each protective plate member with the at least one first engagement member of the corresponding one of the fixing plates, and as a result of disengagement of the at least one second engagement member of the fitting plate part of each protective plate member from the at least one first engagement member of the corresponding one of fixing plates.

2. The bellows with protective plate members according to claim 1,
wherein the fixing plates are fixed in a direction parallel to the second direction, and each of the first engagement members formed on the fixing plates comprises a first engagement part, and a second engagement part formed so as to be spaced from the first engagement part in the direction parallel to the second direction,
each of the second engagement members comprises a third engagement part that engages with a corresponding one of the first engagement parts when an external force is applied on the corresponding fitting plate part from a valley part side to a ridge part side, and a fourth engagement part that engages with a corresponding one of the second engagement parts when an external force is applied on the corresponding fitting plate part from the ridge part side to the valley part side, and
each protective plate member being attachable to and detachable from the corresponding fixing plate, as a result of engagement of the corresponding first engagement part with the corresponding third engagement part, and engagement of the corresponding second engagement part with the corresponding fourth engagement part, and, as a result of disengagement of the corresponding first engagement part from the corresponding third engagement part, and disengagement of the corresponding second engagement part from the corresponding fourth engagement part.

3. The bellows with protective plate members according to claim 2, wherein either the fixing plates or the fitting plate parts each have, formed thereon, an elastic arm which keeps the corresponding fitting plate part and the corresponding fixing plate apart from each other, while maintaining the engagement of the corresponding first engagement part with the corresponding third engagement part, and the engagement of the corresponding, second engagement part with the corresponding fourth engagement member.

4. The bellows with protective plate members according to claim wherein each fixing plate is configured as a single plate having its longest dimension in a direction parallel to the second direction, each of the first engagement members has a shaft part having a top end thereof that protrudes out from a surface of the fixing plate, and a disk part formed at the top end of the shaft part,
each fitting plate part has, formed therein as the second engagement members, engagement holes, each of which engages with the shaft part of a corresponding one of the first engagement members, and
each of the engagement holes has a disk part insertion hole through which the disk part of the corresponding first engagement member is inserted, and an oblong shaft part insertion hole through which the shaft part of the corresponding first engagement member is inserted, wherein the oblong shaft part insertion hole is formed so as to be connected and open to the disk pan insertion hole and to extend from the disk part insertion hole in a direction parallel to the second direction.

5. The bellows with protective plate members according to claim 4, wherein at least one of the plurality of engagement holes has a stopper tongue provided so as to partially close the disk part insertion hole of the at least one engagement hole, a front end of the stopper tongue being capable of elastically deforming so as to deflect away from the bellows body, when applied with an external force, and being capable of elastically deforming underneath the disk part of the corresponding first engagement member, when the disk part of the corresponding first engagement member is inserted through the disk part insertion hole of the at least one engagement hole, and the shaft part of the corresponding first engagement member slides along the shaft part insertion hole.

6. The bellows with protective plate members according to claim 5, wherein each first engagement member has, fixed to a bottom end of the shaft part thereof, a lower disk part which is shaped identically to the disk part, with an upper surface thereof facing a bottom face of the disk part, each fixing plate has, formed therein and arranged in a longitudinal direction thereof, a plurality of Y-shaped oblong holes, and a portion surrounded by each oblong hole forms a tongue which is capable of causing, when applied with an external force, elastic deformation in a front end thereof so as to deflect towards a back face side or a top face side of the fixing plate, forming an opening larger than an outside dimension of the disk part or lower disk part of a corresponding one of the first engagement members, and, capable of allowing the corresponding first engagement member to be fixed to the fixing plate, while keeping the shaft part thereof positioned on a front end side of the tongue.

7. The bellows with protective plate members according to claim 4, wherein, in each fitting plate part, a length in a longitudinal direction of the fitting plate part of the individual oblong shaft part insertion holes of the plurality of engagement holes formed in the fitting plate part: successively increases in the longitudinal direction of the fitting plate part, and each protective plate member is attachable to and detachable from the corresponding fixing plate, as a result of engagement of all of the first engagement members of the fixing plate with all of the engagement holes formed in each fitting plate part by inserting the disk part of a first one of the first engagement members into the disk part insertion hole of a first engagement hole, the first engagement hole having the longest oblong shaft part insertion hole in each fitting plate part, and inserting the shaft part of the first one of the first engagement members into the oblong shaft part insertion hole of the first engagement hole and then, inserting the disk part of a second one of the first engagement members, the second one of the first engagement members being adjacent to the first one of the first engagement members, into the disk part insertion hole of a second engagement hole, the second engagement hole being adjacent to the first engagement hole, and inserting the shaft part of the second one of the first engagement members into the oblong shaft part insertion hole of the second engagement hole; or, as a result of disengagement of all of the first engagement members from all of the engagement holes formed in each fitting plate part by removing the shaft part of the second one of the first engagement members from the oblong shaft part insertion hole of the second engagement hole and removing the disk part of the second one of the first engagement members from the disk part insertion hole of the second engagement hole, and removing the shaft part of the first one of the first engagement members from the oblong shaft part insertion hole of the first engagement hole and removing the disk part of the first one of the first engagement members from the disk part insertion hole of the first engagement hole.

8. The bellows with protective plate members according to claim 7, wherein each first engagement member has, fixed to a bottom end of the shaft part thereof, a lower disk part which is shaped identically to the disk part, with an upper surface thereof facing a bottom face of the disk part, each fixing plate has, formed therein and arranged in a longitudinal direction thereof, a plurality of Y-shaped oblong holes, and a portion surrounded by each oblong hole forms a tongue which is capable of causing, when applied with an external force, elastic deformation in a front end thereof so as to deflect towards a back face side or a top face side of the fixing plate, forming an opening larger than an outside dimension of the disk part or lower disk part of a corresponding one of the first engagement members, and, capable of allowing the corresponding first engagement member to be fixed to the fixing plate, while keeping the shaft part thereof positioned on a front end side of the tongue.

9. The bellows with protective plate members according to claim 4, wherein each first engagement member has, fixed to a bottom end of the shaft part thereof, a lower disk part which is shaped identically to the disk part, with an upper surface thereof fixing a bottom face of the disk part, each fixing plate has, formed therein and arranged in a longitudinal direction thereof, a plurality of Y-shaped oblong holes, and a portion surrounded by each oblong hole forms a tongue which is capable of causing, when applied with an external force, elastic deformation in a front end thereof so as to deflect towards a back face side or a top face side of the fixing plate, forming an opening larger than an outside dimension of the disk part or lower disk part of a corresponding one of the first engagement members, and, capable of allowing the corresponding first engagement member to be fixed to the fixing plate, while keeping the shaft part thereof positioned on a front end side of the tongue.

* * * * *